(12) United States Patent
Belenky et al.

(10) Patent No.: US 9,747,471 B2
(45) Date of Patent: Aug. 29, 2017

(54) SECURE SWITCH BETWEEN MODES

(71) Applicant: Cisco Technology Inc., San Jose, CA (US)

(72) Inventors: Yaacov Belenky, Maaleh Adumim (IL); Chaim Shen-Orr, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 14/100,380

(22) Filed: Dec. 9, 2013

(65) Prior Publication Data

US 2014/0164788 A1    Jun. 12, 2014

(30) Foreign Application Priority Data

Dec. 12, 2012   (IL) .......................................... 223613

(51) Int. Cl.
| | | |
|---|---|---|
| *G06F 11/30* | (2006.01) | |
| *G06F 12/14* | (2006.01) | |
| *G06F 21/74* | (2013.01) | |
| *G06F 21/14* | (2013.01) | |

(52) U.S. Cl.
CPC .............. *G06F 21/74* (2013.01); *G06F 21/14* (2013.01)

(58) Field of Classification Search
CPC .......... G06F 21/57; G06F 21/64; G06F 21/71; G06F 21/74; G06F 2211/008; H04L 9/0825
See application file for complete search history.

(56) References Cited

U.S. PATENT DOCUMENTS

| | | | |
|---|---|---|---|
| 5,530,753 A | 6/1996 | Easter et al. | |
| 5,708,715 A | 1/1998 | Vicard | |
| 6,424,954 B1 * | 7/2002 | Leon .................. | G07B 17/0008 705/401 |
| 6,571,335 B1 * | 5/2003 | O'Donnell .............. | G06F 21/64 713/156 |
| 7,490,245 B2 | 2/2009 | Waltermann et al. | |
| 2009/0070885 A1 * | 3/2009 | Mersh ..................... | G06F 21/79 726/27 |
| 2009/0182919 A1 | 7/2009 | Chang et al. | |
| 2009/0307487 A1 * | 12/2009 | Movva .................... | G06F 21/57 713/156 |

(Continued)

OTHER PUBLICATIONS

"Microprocessor Tutorial", Matthew Eastaugh, http://www.eastaughs.fsnet.co.uk/cpu/structure-alu.htm.*

(Continued)

*Primary Examiner* — Carl Colin
*Assistant Examiner* — Quy Pham
(74) *Attorney, Agent, or Firm* — Samuel M. Katz

(57) ABSTRACT

A state sensitive device is described, the device including a state register which stores a record of the effective-state of the device, a mask field having a value which varies according to a value of the state register, and a processor which changes the value of the mask field to a new value of the mask field when there is a change in the value of the state register, wherein the processor performs a state dependent calculation requiring the value of the mask field as an operand in the state dependent calculation which will yield an incorrect result if the value of the mask field does not properly correspond to the value of the state register. Related methods, systems and apparatus are also described.

14 Claims, 1 Drawing Sheet

(56) References Cited

U.S. PATENT DOCUMENTS

| | | | |
|---|---|---|---|
| 2010/0017840 A1* | 1/2010 | Akins, III | H04N 21/443 |
| | | | 725/131 |
| 2010/0122353 A1* | 5/2010 | Koushanfar | G06F 21/10 |
| | | | 726/33 |
| 2010/0284539 A1* | 11/2010 | Roy | H03K 19/17768 |
| | | | 380/278 |
| 2010/0287374 A1 | 11/2010 | Roy et al. | |
| 2012/0246470 A1* | 9/2012 | Nicolson | G06F 21/57 |
| | | | 713/158 |
| 2012/0246641 A1* | 9/2012 | Gehrmann | G06F 9/445 |
| | | | 718/1 |

OTHER PUBLICATIONS

Rajat Subhra Chakraborty et al., "Security Through Obscurity: An Approach for Protecting Register Transfer Level Hardware IP," *2009 IEEE International Workshop on Hardware-Oriented Security and Trust*, pp. 96-99 (IEEE 2009).

Paul W. Griffin et al., "Clip: Circuit Level IP Protection Through Direct Injection of Process Variations," *IEEE Transactions on Very Large Scale Integration (VLSI) Systems* (IEEE 2011).

Jiawei Huang et al., "IC Activation and User Authentication for Security-Sensitive Systems" (2008).

Farinaz Koushnafar et al., "Designing Chips That Protect Themselves" (dac.com Knowledge Center Article, Mar. 2010).

Farinaz Koushnafar, "Integrated Circuits Metering for Piracy Protection and Digital Rights Management: An Overview," *GLSVLSI '11* (ACM May 4, 2011).

Jarrod A. Roy et al., "Epic: Ending Piracy of Integrated Circuits" (2008).

\* cited by examiner

SECURE SWITCH BETWEEN MODES

BACKGROUND OF THE INVENTION

The following non-patent literature references are believed to reflect the state of the art:

EPIC: Ending Piracy of Integrated Circuits, J. A. Roy, F. Koushanfar, I. L. Markov., DATE '08, Proceedings of the conference on Design, Automation, and Test, in Europe, pages 1069-1074;

Designing Chips That Protect Themselves, F. Koushanfar and I. L. Markov, ACM DAC Knowledge Center, March 2010;

IC Activation and User Authentication for Security-Sensitive Systems, J. Huang and J. Lach, Hardware-Oriented Security and Trust, 2008. HOST 2008, pages 76-80;

Security Through Obscurity an Approach for Protecting Register Transfer Level Hardware IP, Chakraborty, R. S.; Bhunia, S., Hardware-Oriented Security and Trust, 2008. HOST 2008, pages 96-99;

CLIP: Circuit Level IC Protection Through Direct Injection of Process Variations, W. P. Griffin, A. Raghunathan, and K. Roy, IEEE Transactions on Very Large Scale Integration (VLSI) Systems, May 2012, Vol. 20, no. 5, pages 791-803; and Integrated Circuits Metering for Piracy Protection and Digital Rights Management: An Overview, F. Koushanfar, GLVSVLSI, 2011.

The following patent literature references are also believed to reflect the state of the art:

US 2009/0182919 of Chang, et al.;
US 2010/0287374 of Roy, et al.;
US 2010/0122353 of Koushanfar, et al.;
US 2010/0284539 of Roy, et al.;
U.S. Pat. No. 5,530,753 to Easter, et al.;
U.S. Pat. No. 5,708,715 to Vicard;
U.S. Pat. No. 6,571,335 to O'Donnell, et al.; and
U.S. Pat. No. 7,490,245 to Waltermann, et al.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
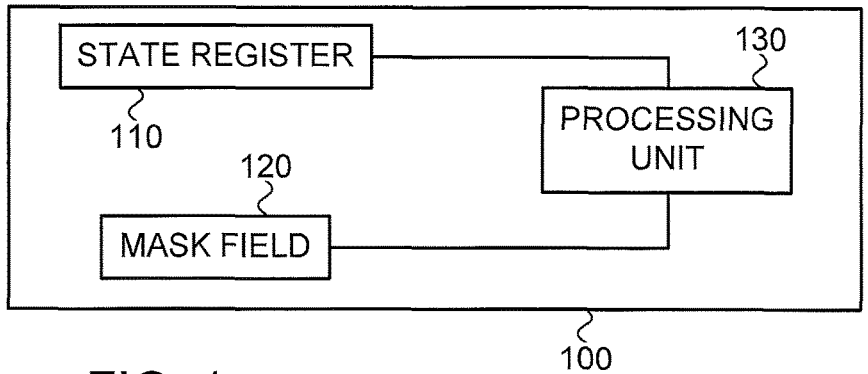
FIG. 1 is a simplified block diagram illustration of a state sensitive device constructed and operative in accordance with an embodiment of the present invention.

Reference is now made to FIG. 1 which 1 is a simplified block diagram illustration of a state sensitive device 100 constructed and operative in accordance with an embodiment of the present invention. The device 100 depicted in FIG. 1 is one embodiment of a device in which information needed for proper operation of the device is dependent on a change occurring within components of the device, as described herein below.

The device 100 of FIG. 1 comprises a state register 110, which stores a record of the effective-state of the device. Typically, a secure device has multiple modes of operation (e.g. serialization mode, test mode, functional mode etc.). Different modes of operation are intended for different environments and provide different level of security. For example, many fields inaccessible in functional mode may be accessible in a test mode. Typically, permissions to perform certain operations (for example, and without limiting the generality of the foregoing, read to write memory regions, burn OTP, perform certain commands, enable certain functionality) depend on the value in the state register 110. Therefore, in order to ensure that those fields remain inaccessible when the device is in functional mode, security measures should be taken to enforce only authorized modes.

For instance, the device might be under test, or being programmed, or in use in the field, or be in other possible device states. One scheme for storing the effective-state of the device (in two bits) would be that storing 00 in the state register 110 indicates that the device is being programmed; storing 01 in the state register 110 indicates that the device is under test; and storing 10 in the state register 110 indicates that the device is in use in the field. Persons skilled in the art will appreciate that the scheme presented here is an exemplary scheme, and in no way meant to be limiting nor is this scheme presented to the exclusion of any other possible scheme.

Those skilled in the art will appreciate that if an attacker were to somehow manage to change the value of the state register 110, then the attacker is able to switch the device into an unauthorized mode.

The device 100 of FIG. 1 also comprises a mask field 120. The value of the mask in the mask field 120 varies according to the value of the state register 110. For instance, if the value of the state register 110 is changed from 00 to 10, then the value of the mask field 120 is changed accordingly as a consequence of the change in the value of the state register 110. The mechanism of the change of the value of the mask field 120 as a consequence of the change in the value of the state register 110 is described below.

A processing unit 130 (i.e. a processor) comprised in the device 100 changes the value of the mask field 120 as a consequence of a change to the value of the state register 110.

Every so often, calculations performed by the device 100 are state dependent calculations. The state dependent calculation requires the value of the mask field 120 as an operand in the state dependent calculation. Accordingly, if the value of the mask field 120 is incorrect (i.e. the mask field 120 does not properly correspond to the value of the state register 110), the state dependent calculation will yield an incorrect result. Alternatively, if the value of the mask field 120 is correct (i.e. the mask field 120 properly corresponds to the value of the state register 110), the state dependent calculation will yield a correct result. For instance, the device may be in the process of performing a series of calculations. The result of the series of calculations may then be used as a first operand in a calculation which has the value of the mask field 120 as the second operand.

For instance, if the result of the series of calculations is logically ORed with the value of the mask field 120, and the value of the mask field 120 is 000 . . . 000, then the result of the calculation with the value of the mask field 120 is equal to the result of the series of calculations. Thus, if the value of the mask field 120 is correctly 000 . . . 000, then such a calculation will yield the correct result, namely, the result of the series of calculations.

A second example would be to logically AND the result of the series of calculations with the value of the mask field if the value of the mask field is 111 . . . 111, again, thereby producing the correct result, which is equal to the result of the series of calculations. Here too, if the value of the mask field is incorrect, ensuing calculations will yield an incorrect result.

A third option would be where the hardware and software which perform the series of calculations are deliberately designed to yield a result of the series of calculations which is deliberately incorrect. However, performing an operation on the result of the series of calculations, for instance XOR, with the value of the mask field 120 yields the correct result (i.e. [result of the series of calculations] XOR [mask field]=[correct result]).

Therefore, a change of the state register 110 requires a change in the value of the mask field 120. Performing such a change of the value of the mask field 120 ensures that calculations which involve the value of the mask field 120 in the new state yield correct results.

By way of example, let State1 and State2 be two device states, and Operation1 and Operation2—two operations, where Operation1 is performed with the value of the mask field 120 only in State1, and Operation2 is performed with the value of the mask field 120 only in State2. For instance, in State1, logical OR (or arithmetical addition) is performed with the value of the mask field 120 (i.e. logical OR (or arithmetical addition) is Operation1)). MASK=000 . . . 00 is enforced in State1. By contrast, in State2, logical AND is performed with the value of the mask field 120 (i.e. logical AND is Operation2). MASK=111 . . . 11 is enforced in State 2.

Occasionally, while in State1, Operation1 (i.e. logical OR (or arithmetical addition)) is performed. In that the mask value, MASK=000 . . . 00 is enforced in State1, and not tampered with, the result of performing Operation1 is a correct, anticipated result, and the device continues to operate correctly.

At some point, the device state is changed (e.g. the state register 110 is changed from 0 to 1), and the device is now in State2. Accordingly, MASK=111 . . . 11 is now enforced.

An attacker may change the device state from State2 to State1 (that is the state register 110 is changed back from 1 to 0). For instance, an attacker might wish to change the device state from "in the field" to "programmable". If the value of the MASK remains unchanged, i.e., MASK= 111 . . . 11, then it is highly likely that Operation1, performed in State1 (i.e. logical OR (or arithmetical addition)) will give an incorrect or unanticipated result. As such, further calculations performed with the result of calculations with the value of the mask field 120 will typically yield an incorrect result.

Even were the attacker able to change part of the MASK bits, but not all of them, then the remaining unchanged string of "1" bits will result in Operation1 failing. Now in order to correctly perform a prohibited operation in the current state operation, the attacker must change not only the state register 110, but also ALL bits of the mask field 120, which is typically much more difficult, as typically there are a large numbers of such bits, often as many as 64 or 128 bits, for example.

A mask field 120 value of all-ones or all-zeros may be easier to be forced by the attacker. Such an attack may be performed, for example, by subjecting the device to a strong magnetic field or exposing the device to an ultraviolet light. In such a case, it is typically the case that if the value of the mask field 120 was all-zeros, then all of the zeros in the field would be affected the same way by the magnetic field or the ultraviolet light. That is to say, all of the bits in the field would be expected to undergo the same change as a result of the attack.

Accordingly, it may be desirable to use other values for the mask field 120. By way of example, the mask field 120 may contain half zeros and half ones, and during the calculations ones are logically ANDed and zeros are logically ORed. In another state, however, all of the bits of the mask field 120 may have the opposite value.

Alternatively, the mask field 120 may have a value which appears random, and is arithmetically added during the operation, before or after addition with a constant, so that the two additions together have a desired effect, as long as the mask field 120 corresponds to the value of the state register 110. For instance, such an embodiment may be implemented in the case mentioned above where the hardware and software which perform the series of calculations which are deliberately designed to yield a result of the series of calculations which is deliberately incorrect. As was noted above, the value of the mask field 120 may be XORed with the apparently incorrect result of the series of calculations, in order to yield the desired result.

Upon transition of the effective-state of the device 100, the state register 110 is changed, using methods known in the art. The processing unit 130 may load a new value to the mask field 120.

Alternatively, the new value of the mask field 120 may be determined by the device 100 performing a predetermined calculation and using the result of the predetermined calculation as the new value of the mask field 120.

For example, the condition of a state transition is an asymmetric signature algorithm successfully performing a signature verification of an executable code segment (or other element which might be digitally signed and the signature verified). For example, and without limiting the generality of the foregoing, asymmetric signature algorithms which might be performed on an executable code segment might include DSA, ECDSA (elliptical curve digital signature algorithm), or RSA/Rabin signatures. By way of example, an RSA/Rabin signature verification of an executable code segment (or other element which might be digitally signed and the signature verified). Those skilled in the art will appreciate that in RSA/Rabin signature verification, a public key operation is performed on the RSA/Rabin signature. The result of the public key operation is then verified. The device now switches from serialization mode to operational mode. The value of the state register is also changed. In keeping with the example above, verifying the RSA/Rabin signature switches the device from State0 to State1. If the result of application of the public key operation to the signature is expected to contain a predefined pattern, then this pattern, or some function of it, may be used as the value of the mask field 120 for the new state (i.e. a portion of the signature is copied to the mask field 120). If the signature is authentic, the copied portion has a known value. The known value is used, as the mask field 120, in the state dependent calculations. In that the value is the correct value, then the state dependent calculations yield correct results.

Those skilled in the art will appreciate that the above example, wherein successfully performing an asymmetric signature algorithm verification of an executable code segment is by way of example and a symmetric signature algorithm verification of an executable code segment may also effect the change of state. Non-limiting examples of symmetric signature algorithms include AES, DES, and Serpent.

A consequence of this method of changing the value of the mask field 120 is that an attacker wishing to get the value of the mask field 120 by a brute force attack (i.e. trying to verify a large number of signatures) would likely be frustrated by the large number of bits (as noted above 64 or 128) which would have to exactly match the required target mask field value.

Alternatively, if RSA/Rabin signature verification fails and state transition does not occur, the value of the mask field 120 typically will not have the expected value, and therefore, state dependent calculations will yield an incorrect result.

For example, and focusing on just 16 bits of the mask field, if the RSA/Rabin signature is verified, then a certain portion of the signature becomes the mask field. Suppose that the first 16 bits of this portion of the signature are: 0110011000110100. These 16 bits are copied to the first 16 bits of the mask field 120. When a state dependent calculation, say logical AND, is performed with the mask field 120 and result of the series of calculations, then the result of the state dependent calculation will be correct only if the mask field 120 is correct.

It is appreciated that using the mask field as described herein enables making decisions about the validity of a derived value without using an "IF" statement, or its equivalent. The ability to make decisions without using an "IF" statement, or its equivalent is important because "classic" decision mechanisms are subject to attacks e.g. "glitching" at the point of decision, while the aspects of the present invention describe herein are not subject to such attacks.

Additionally, the values stored in the state register 110 could comprise a small number of bits, but can be expanded to a large number of bits and subsequently the large number of bits can be used as a mask in performing state dependent calculations. Subsequently, an equivalent of an "IF" statement applied to the result of the state dependent calculation may cover, for example, three possible states—serialization, testing and operational. The state register 110 would then have three legal values, and many illegal values. The value of the state itself can now be used as a mask in each one of the branches of the equivalent of the "IF" statement, so that any value other than the one corresponding to that branch results in incorrect calculations and eventual failure. As a consequence of this:

1) Illegal values are rejected by the regular state, i.e. a decision mechanisms; and
2) illegal values, OR legal values but wrong state, are rejected through a "non-decision" mechanism.

Figure 2:
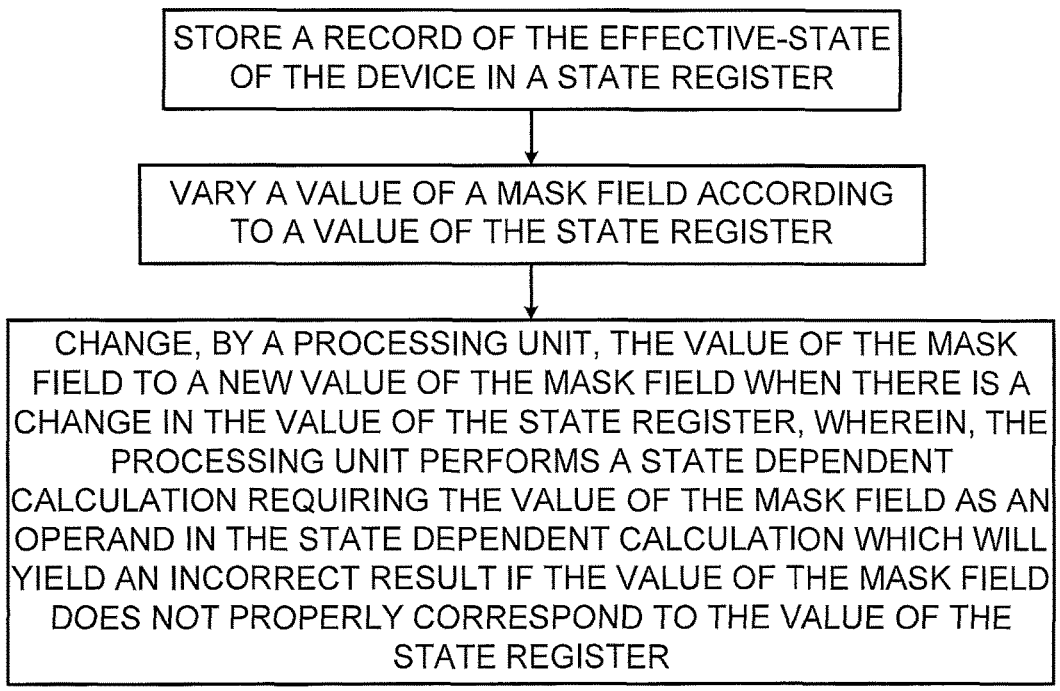
FIG. 2 is a simplified flowchart diagram of methods of operation of the system of FIG. 1.

Reference is now made to FIG. 2, which is a simplified flowchart diagram of methods of operation of the system of FIG. 1. The method of FIG. 2 is believed to be self-explanatory in light of the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A state sensitive device comprising:
a state register which stores a record having a value indicative of the effective-state of the state sensitive device;
a mask field having a value which varies according to a value of the state register; and
a processor which changes the value of the mask field to a new value of the mask field in response to a change in the value of the record stored in the state register; wherein one of a public key asymmetric signature algorithm signature verification operation or a symmetric signature algorithm signature verification operation indicates a change in the effective-state, and after the verification operation verifies the signature, a portion of a result of an application of one of a public key operation or a symmetric signature operation becomes the new value of the mask field;
the processor being configured to perform a state dependent calculation while the state register remains unchanged, the state dependent calculation requiring the value of the mask field as an operand, said state dependent calculation yielding a correct result when the mask field properly corresponds to the value of the state register, in which case the state sensitive device continues to operate correctly, the continuing to operate correctly of the state sensitive device being contingent on calculations being performed correctly using the value of the state register, and not on a conditional programming statement, and said state dependent calculation yielding an incorrect result when the mask field does not properly correspond to the value of the state register.

2. The device according to claim 1, wherein a change in the value of the state register reflects a change in a mode of operation of the device from a first mode of operation to a second mode of operation.

3. The device according to claim 1, wherein the state dependent calculation will yield a correct result it the value of the mask field properly corresponds to the value of the state register.

4. The device according to claim 1, wherein a change of the value of the state register necessitates a change in the value of the mask field in order to ensure that the state dependent calculation is correctly performed.

5. The device according to claim 1, wherein the processor loads a new value to the mask field.

6. The device according to claim 1 wherein the mask field value is updated by the processor performing a predetermined calculation and using the result of the predetermined calculation as the new value of the mask field.

7. The device according to claim 1 wherein the asymmetric signature algorithm comprises one of:
an RSA/Rabin signature verification operation;
a DSA signature verification operation; and
an ECDSA signature verification operation.

8. The device according to claim 1 wherein the indication of the change of the effective-state results in:
a change in the value of the state register;
a utilization of one of the following as the new value of the mask field:
the result of the application of a public key operation to the asymmetric signature; and
a result of applying a function of the result of the application of the public key operation to the asymmetric signature.

9. The device according to claim 1 wherein the symmetric signature algorithm comprises one of:
an AES signature verification operation;
a DES signature verification operation; and
a Serpent signature verification operation.

10. The device according to claim 1 wherein the indication of the change of the effective-state results in:
   a change in the value of the state register;
   a utilization of one of the following as the new value of the mask field:
      a result of the application of the symmetric signature; and
      a result of applying a function of the result of the application of the symmetric signature.

11. The device according to claim 1 wherein the stored record having a value indicative of the effective-state of the device is expanded to a value which comprises the value of the mask field.

12. The device according to claim 1 wherein a small number of bits stored in the state register are expanded to a large number of bits.

13. The device according to claim 12 wherein said large number of bits are used as a mask in performing a state dependent calculation.

14. A method for a state sensitive device, the method comprising:
   storing a record of the effective-state of the state sensitive device in a state register;
   varying a value of a mask field according to a value of the state register; and
   changing, by a processor, the value of the mask field to a new value of the mask field in response to a change in the value of the record stored in the state register; wherein one of a public key asymmetric signature algorithm signature verification operation or a symmetric signature algorithm signature verification operation indicates a change in the effective-state, and after the verification operation verifies the signature, a portion of a result of an application of one of a public key operation or a symmetric signature operation becomes the new value of the mask field;
   performing a state dependent calculation while the state register remains unchanged, at the processor, the state dependent calculation requiring the value of the mask field as an operand, said state dependent calculation yielding a correct result when the mask field properly corresponds to the value of the state register, in which case the state sensitive device continues to operate correctly, the continuing to operate correctly of the state sensitive device being contingent on calculations being performed correctly using the value of the state register, and not on a conditional programming statement, and said state dependent calculation yielding an incorrect result when the mask field does not properly correspond to the value of the state register.

* * * * *

UNITED STATES PATENT AND TRADEMARK OFFICE
CERTIFICATE OF CORRECTION

PATENT NO. : 9,747,471 B2  
APPLICATION NO. : 14/100380  
DATED : August 29, 2017  
INVENTOR(S) : Belenky et al.

Page 1 of 1

It is certified that error appears in the above-identified patent and that said Letters Patent is hereby corrected as shown below:

In the Claims

In Column 6, Line 33 (second line of Claim 3), delete "it" and substitute therefor --if--.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*